(12) United States Patent
Chang et al.

(10) Patent No.: US 11,157,093 B1
(45) Date of Patent: Oct. 26, 2021

(54) COMPUTER MOUSE WITH VIBRATION FUNCTION

(71) Applicant: SUNREX TECHNOLOGY CORP., Taichung (TW)

(72) Inventors: Che-Hsun Chang, Taichung (TW); Yun-Chuan Wang, Taichung (TW); Kuan-Jung Li, Taichung (TW); Tao Chou, Taichung (TW); Chun-Chieh Chen, Taichung (TW); Shi-Ming Chen, Taichung (TW); Jia-Bao Lin, Taichung (TW)

(73) Assignee: SUNREX TECHNOLOGY CORP., Taichung (TW)

(*) Notice: Subject to any disclaimer, the term of this patent is extended or adjusted under 35 U.S.C. 154(b) by 0 days.

(21) Appl. No.: 17/222,449

(22) Filed: Apr. 5, 2021

(30) Foreign Application Priority Data

Dec. 28, 2020 (TW) ................................ 109217208

(51) Int. Cl.
  *G06F 3/0354* (2013.01)
  *G06F 3/01* (2006.01)
  *G06F 1/16* (2006.01)

(52) U.S. Cl.
  CPC .......... *G06F 3/03543* (2013.01); *G06F 1/169* (2013.01); *G06F 3/016* (2013.01); *G06F 3/03541* (2013.01); *G06F 2203/0333* (2013.01)

(58) Field of Classification Search
  CPC .. G06F 3/03543; G06F 3/016; G06F 3/03541; G06F 2203/0333; G06F 1/169
  See application file for complete search history.

(56) References Cited

U.S. PATENT DOCUMENTS

| | | | |
|---|---|---|---|
| 2002/0024501 A1* | 2/2002 | Shalit | G09B 23/28 345/163 |
| 2002/0054061 A1* | 5/2002 | Hoffman, Jr. | G06F 9/453 715/705 |
| 2004/0135771 A1* | 7/2004 | Rieck | G06F 3/038 345/163 |
| 2006/0187206 A1* | 8/2006 | Jing | G06F 3/03543 345/163 |
| 2007/0188451 A1* | 8/2007 | Sun | G06F 3/03543 345/163 |
| 2008/0316171 A1* | 12/2008 | Shahoian | G06F 3/016 345/158 |
| 2011/0279371 A1* | 11/2011 | Ma | G06F 3/03543 345/163 |
| 2017/0090578 A1* | 3/2017 | Keller | G06T 19/006 |
| 2017/0243451 A1* | 8/2017 | Alghooneh | G08B 6/00 |
| 2017/0249024 A1* | 8/2017 | Jackson | G06F 3/038 |
| 2017/0285747 A1* | 10/2017 | Chen | G06F 3/016 |
| 2021/0052989 A1* | 2/2021 | Blum | A63G 31/16 |
| 2021/0149491 A1* | 5/2021 | Takahashi | H02K 33/18 |

* cited by examiner

*Primary Examiner* — Ariel A Balaoing
(74) *Attorney, Agent, or Firm* — Crowell & Moring LLP

(57) ABSTRACT

A computer mouse with vibration function includes a base, a press control module disposed on a front portion of the base, a palm support disposed on a rear portion of the base, a vibrator installed on the palm support for receiving the signal from the computer, and a plurality of vibration damping units each of which includes a vibration damper abutting between the palm support and the base. The vibration dampers of the vibration damping units are disposed around the vibrator.

7 Claims, 2 Drawing Sheets

COMPUTER MOUSE WITH VIBRATION FUNCTION

CROSS-REFERENCE TO RELATED APPLICATION

This application claims priority to Taiwanese Patent Application No. 109217208, filed on Dec. 28, 2020.

FIELD

The disclosure relates to a computer mouse, and more particularly to a computer mouse with vibration function.

BACKGROUND

Due to the prevalence of the electronic gaming industry in recent years, more and more computer peripherals for gaming purposes are provided in the market. A computer mouse is one of the indispensable products. In addition to having a precise control, a comfortable grip and a dazzling appearance, the computer mouse with vibration function can bring a user to a more realistic gaming experience.

However, the existing computer mouse with the vibration function has the following drawbacks:

1. The vibration of the computer mouse may interfere with pointing accuracy.

2. As the computer mouse is placed on a tabletop, the vibration of the computer mouse is absorbed by the tabletop, so that the vibration effect is reduced and weakened.

3. When the computer mouse vibrates, the parts thereof also vibrate, thereby producing friction and making an abnormal sound or noise.

SUMMARY

Therefore, an object of the present disclosure is to provide a computer mouse that can alleviate at least one of the drawbacks of the prior art.

According to this disclosure, a computer mouse is configured to vibrate when receiving a signal from a computer, and includes a base, a press control module, a palm support, a vibrator, and a plurality of vibration damping units. The press control module is disposed on a front portion of the base. The palm support is disposed on a rear portion of the base. The vibrator is installed on the palm support and is configured for receiving the signal from the computer. Each of the vibration damping units includes a vibration damper abutting between the palm support and the base. The vibration dampers of the vibration damping units are disposed around the vibrator.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
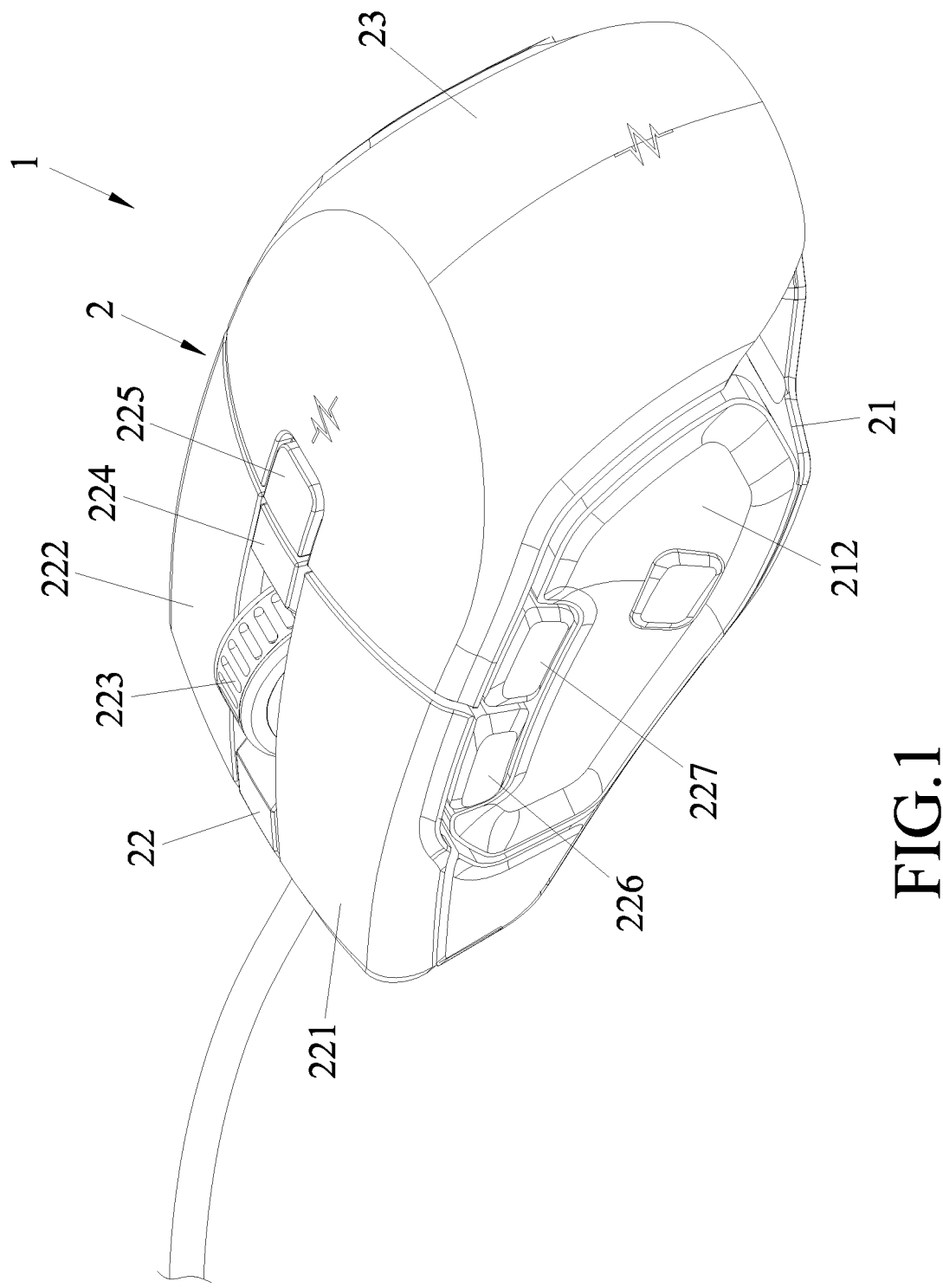
FIG. 1 is a perspective view of a computer mouse according to an embodiment of the present disclosure.
Figure 2:
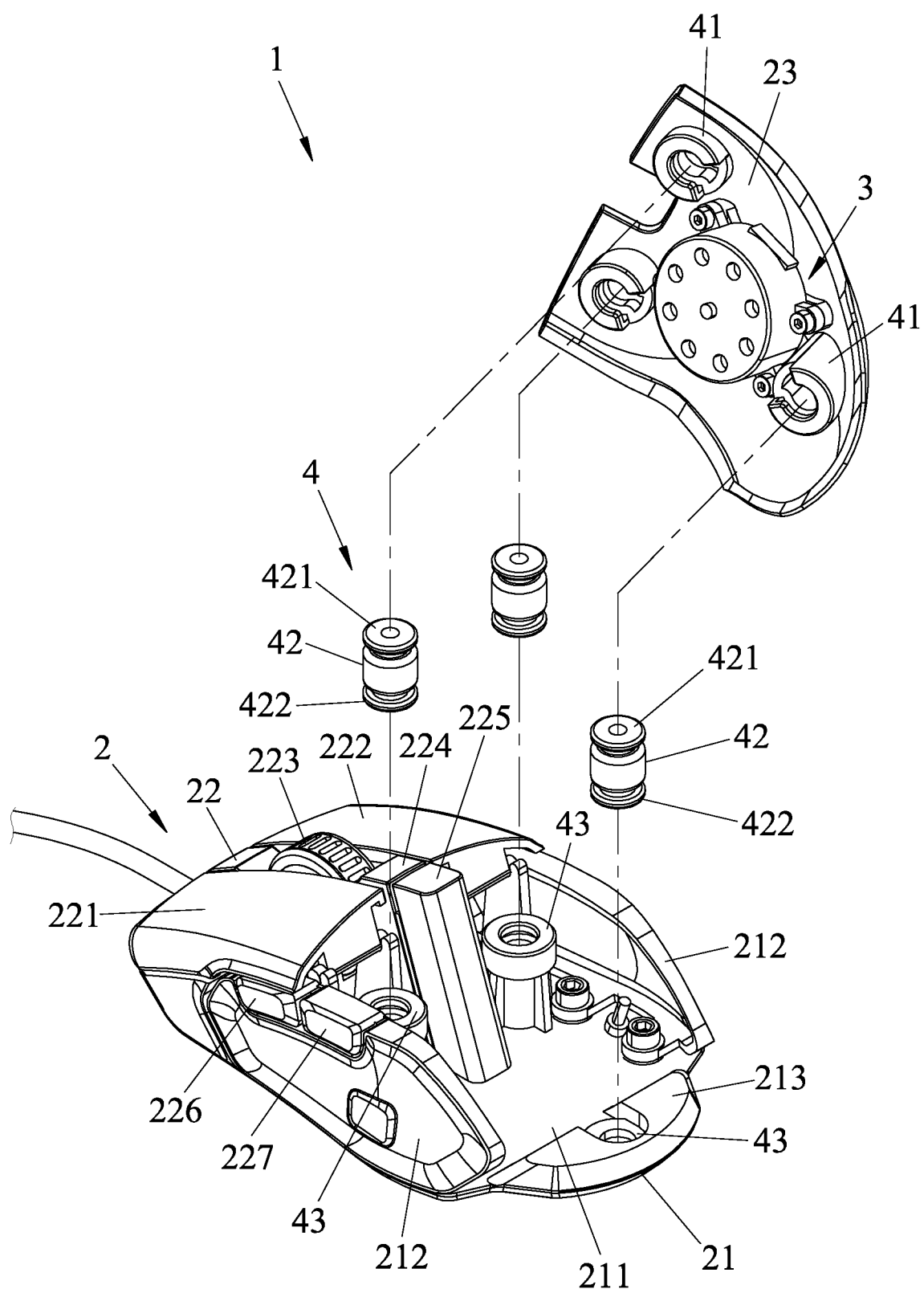
FIG. 2 is an exploded perspective view of the embodiment.

Referring to FIGS. 1 and 2, a computer mouse 1 according to an embodiment of the present disclosure is configured to vibrate when receiving a signal from a computer (not shown), and includes a mouse body 2, a vibrator 3, and three vibration damping units 4.

The mouse body 2 includes a base 21, a press control module 22 disposed on a front portion of the base 21, and a palm support 23 disposed on a rear portion of the base 21 and adjacent to the press control module 22.

The base 21 includes a bottom wall 211, and two side walls 212 extending respectively and upwardly from left and right sides of the bottom wall 211 for supporting the press control module 22 and the palm support 23. The bottom wall 211 has a protruding piece 213 extending upwardly from a rear end thereof.

The press control module 22 includes a left button 221, a right button 222, a scroll wheel 223, a first press key 224, a second press key 225, a third button 226 and a fourth button 227. The scroll wheel 223 is disposed between the left and right buttons 221, 223. The first press key 224 is disposed between the left and right buttons 221, 222, and is located at a rear side of the scroll wheel 223. The second press key 225 extends upwardly from the base 21, and is located at a rear side of the first press key 224. The third button 226 is disposed on the side wall 212 that extends from the left side of the bottom wall 211, and is located at a bottom end of the left button 221. The fourth button 227 is located at a rear end of the third button 226, and is adjacent to the palm support 23. In this embodiment, the first press key 224, the second press key 225, the third button 226, and the fourth button 227 are respectively configured for triggering pre-programmed functions, such as Page Up, Page Down, Paste, Copy, and so on.

The vibrator 3 is installed on the palm support 23, is configured for receiving the signal from the computer, and vibrates in response thereto. In this embodiment, the vibrator 3 is a linear motor, but is not limited thereto, and may be a rotor motor or a piezoelectric motor.

Each vibration damping unit 4 includes a first connection member 41, a vibration damper 42, and a second connection member 43. The first connection member 41 is disposed on the palm support 23 for connection with a top portion 421 of the vibration damper 42. The second connection member 43 is disposed on the base 21 and corresponds to the first connection member 41 for connection with a bottom portion 422 of the vibration damper 42, so that the vibration damper 42 abuts between the palm support 23 and the base 21. The first connection members 41 of the vibration damping units 4 surround the vibrator 3. The second connection members 43 of two of the vibration damping units 4 are configured as tubular sleeves that project upwardly from the bottom wall 211, that are respectively located on left and right sides of the second press key 225, and that are respectively proximate to the left and right buttons 221, 222. The second connection member 43 of a third of the vibration damping unit 4 is configured as a recessed hole formed in the protruding piece 213. In this embodiment, the vibration damper 42 of each vibration damping unit 4 is made of a silicone material. The vibration dampers 42 of the vibration damping units 4 are disposed around the vibrator 3.

In use, when the vibrator 3 receives a signal from the computer and vibrates, the vibrations produced by the vibrator 3 are transmitted to the palm support 23, and with the vibration damper 42 of each vibration damping unit 4 abutting between the palm support 23 and the base 21, the transmission of the vibrations from the palm support 23 to the base 21 can be effectively reduced, so that most vibrations occur only on the palm support 23. In addition to preventing the vibrations from being transmitted to the bottom wall 211 and being absorbed by the tabletop, this disclosure also can prevent the vibrations from affecting the pointing accuracy and from producing an abnormal sound or noise caused thereby.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A computer mouse configured to vibrate when receiving a signal from a computer, comprising,
    a base;
    a press control module disposed on a front portion of said base;
    a palm support disposed on a rear portion of said base;
    a vibrator installed on said palm support and configured for receiving the signal from the computer; and
    a plurality of vibration damping units each of which includes a vibration damper abutting between said palm support and said base, said vibration dampers of said vibration damping units being disposed around said vibrator.

2. The computer mouse as claimed in claim 1, wherein each of said vibration damping units further includes a first connection member disposed on said palm support for connection with a top portion of a respective one of said vibration dampers.

3. The computer mouse as claimed in claim 2, wherein each of said vibration damping units further includes a second connection member disposed on said base for connection with a bottom portion of the respective one of said vibration dampers.

4. The computer mouse as claimed in claim 3, wherein said press control module includes:
    a left button;
    a right button;
    a scroll wheel disposed between said left and right buttons;
    a first press key disposed between said left and right buttons and adjacent to said scroll wheel for triggering a pre-programmed function; and
    a second press key extending upwardly from said base and adjacent to a side of said first press key that is opposite to said scroll wheel for triggering a pre-programmed function.

5. The computer mouse as claimed in claim 4, wherein:
    said base includes a bottom wall, and two side walls extending respectively and upwardly from left and right sides of said bottom wall for supporting said press control module and said palm support, said bottom wall having a protruding piece extending upwardly from a rear end thereof; and
    said press control module further includes a third button and a fourth button respectively configured for triggering pre-programmed functions, said third button being disposed on one of said side walls that extends from said left side of said bottom wall and being adjacent to a bottom end of said left button, said fourth button being adjacent to said third button and said palm support.

6. The computer mouse as claimed in claim 5, wherein:
    said computer mouse comprises three said vibration damping units;
    said second connection members of two of said vibration damping units are configured as tubular sleeves that project upwardly from said bottom wall, that are respectively located on left and right sides of said second press key, and that are respectively proximate to said left and right buttons; and
    said second connection member of the other one of said vibration damping units is configured as a recessed hole formed in said protruding piece.

7. The computer mouse as claimed in claim 1, wherein each of said vibration dampers is made of a silicone material.

* * * * *